United States Patent
Oshima et al.

(10) Patent No.: US 8,574,126 B2
(45) Date of Patent: Nov. 5, 2013

(54) VEHICLE AND FUEL FEED STOP CONTROLLER

(75) Inventors: Takeru Oshima, Kobe (JP); Takuya Sakamoto, Akashi (JP); Kozo Suzuki, Kobe (JP); Makoto Furukawa, Kitakyushu (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 964 days.

(21) Appl. No.: 12/563,014

(22) Filed: Sep. 18, 2009

(65) Prior Publication Data

US 2010/0076667 A1 Mar. 25, 2010

(30) Foreign Application Priority Data

Sep. 22, 2008 (JP) .................... 2008-242205

(51) Int. Cl.
*B60W 10/02* (2006.01)
(52) U.S. Cl.
USPC ........................................................ 477/181
(58) Field of Classification Search
USPC ........................................................ 477/181
See application file for complete search history.

(56) References Cited

U.S. PATENT DOCUMENTS

| | | | | |
|---|---|---|---|---|
| 3,489,127 A * | 1/1970 | Higashigawa | ............. | 123/339.1 |
| 4,192,279 A * | 3/1980 | Maisch et al. | ............. | 123/198 F |
| 5,928,111 A * | 7/1999 | Sakakibara et al. | .......... | 477/181 |
| 6,709,364 B2 * | 3/2004 | Eguchi et al. | .................. | 477/174 |
| 7,475,677 B2 * | 1/2009 | Mori et al. | ..................... | 123/492 |
| 2002/0074173 A1 * | 6/2002 | Morimoto et al. | ........... | 180/65.2 |
| 2005/0215396 A1 * | 9/2005 | Shimada et al. | .............. | 477/181 |
| 2005/0261112 A1 * | 11/2005 | Kiuchi | ........................... | 477/181 |
| 2007/0144494 A1 * | 6/2007 | Mori et al. | ..................... | 123/493 |
| 2010/0076667 A1 * | 3/2010 | Oshima et al. | ................. | 701/103 |

FOREIGN PATENT DOCUMENTS

| | | |
|---|---|---|
| JP | 57135238 A | 8/1982 |
| JP | 62244729 A | 10/1987 |
| JP | 3031538 A | 2/1991 |
| JP | 2005-076600 | 3/2005 |

* cited by examiner

*Primary Examiner* — David D Le
*Assistant Examiner* — Steven B Christ
(74) *Attorney, Agent, or Firm* — Alleman Hall McCoy Russell & Tuttle LLP (57) ABSTRACT

A vehicle including an engine coupled to a transmission via a clutch, includes a fuel feed stop controller configured to stop fuel feeding to the engine when a first fuel feed stop condition is satisfied, and a clutch state detector configured to detect whether the clutch is engaged or disengaged, wherein the fuel feed stop controller is configured to resume the fuel feeding to the engine, when a second fuel feed stop condition continues to be satisfied and the clutch continues to be disengaged for a predetermined delay time from a time point when the first fuel feed stop condition is satisfied and the clutch state detector starts to detect that the clutch is disengaged.

16 Claims, 7 Drawing Sheets

VEHICLE AND FUEL FEED STOP CONTROLLER

TECHNICAL FIELD

The present invention relates to a vehicle in which an engine is coupled to a transmission via a clutch and fuel feeding to the engine is stopped when a predetermined fuel feed stop condition is satisfied, and a fuel feed stop controller configured to stop fuel feeding to the engine.

BACKGROUND ART

Typically, a reference value of an amount of a fuel fed to an engine is predetermined according to an engine speed, a throttle valve opening degree, etc. A controller for controlling the operation of the engine is configured to determine the fuel feed amount determined as the reference value based on the engine speed, the throttle valve opening degree, etc. obtained from sensors, and to cause a fuel injector to feed the determined amount of fuel to the intake-air.

In recent years, the engine uses fuel feed stop control for stopping fuel feeding to the engine when the engine is in a predetermined deceleration state, to improve fuel consumption efficiency and reduce an exhaust gas (see, e.g., Japanese Laid-Open Patent Application Publication No. 2005-76600.) When a clutch is disengaged during the fuel feed stop control, an inertia force of a drive wheel is not transmitted to the engine and an engine stall tends to occur. Therefore, in a state where the clutch is disengaged, the fuel feeding to the engine is resumed.

At a time point when a clutch switch for detecting a clutch state is in a state near a boundary between an ON-state and an OFF-state, an ON-signal and an OFF-signal are output alternately in a very short time period. In this case, stopping of the fuel feeding and starting of the fuel feeding may be undesirably repeated in a very short time period. This phenomenon is called "chattering." To avoid this, the fuel feed stop control is not initiated promptly, even if the fuel feed stop condition is satisfied immediately after the fuel feeding to the engine is resumed, but is initiated after a lapse of a predetermined time. Thus, responsiveness to the initiation of the fuel feed stop control is set low.

When a driver disengages the clutch to downshift a transmission gear position in a decelerated state, an engine stall will not occur if the fuel feed stop control is continued because a time period when the driver operates the clutch to disengage it is very short. However, the fuel feeding to the engine is resumed although the time period when the clutch is disengaged by the driver is very short. Once the fuel feeding to the engine is resumed, the fuel feeding continues for some time to inhibit "chattering," even if the fuel feed stop condition is satisfied again. This results in wasteful fuel feeding. As a result, fuel consumption efficiency and exhaust gas capability are reduced.

SUMMARY OF THE INVENTION

The present invention addresses the above-described problem, and an object of the present invention is to improve fuel consumption efficiency and exhaust gas capability in a vehicle using fuel feed stop control.

According to an aspect of the present invention, a vehicle, including an engine coupled to a transmission via a clutch, comprises a fuel feed stop controller configured to stop fuel feeding to the engine when a first fuel feed stop condition is satisfied; and a clutch state detector configured to detect whether the clutch is engaged or disengaged; wherein the fuel feed stop controller is configured to resume the fuel feeding to the engine when a second fuel feed stop condition continues to be satisfied and the clutch continues to be disengaged for a predetermined delay time from a time point when the first fuel feed stop condition is satisfied and the clutch state detector starts to detect that the clutch is disengaged.

In accordance with the configuration, when the clutch is engaged before a lapse of a delay time after the clutch starts to be disengaged, in the state where the first fuel feed stop condition is satisfied, the fuel feeding to the engine will not be resumed. This reduces the chances for fuel feeding. As a result, fuel consumption efficiency is improved and an exhaust gas is reduced. Since the catalyst for cleaning the exhaust gas can be reduced by reducing the exhaust gas, a cost is reduced. When the second fuel feed stop condition continues to be satisfied and the clutch continues to be disengaged for a predetermined delay time from a time point when the first fuel feed stop condition is satisfied and the clutch starts to be disengaged, the fuel feeding to the engine is resumed. This makes it possible to inhibit an engine stall in the case where the clutch continues to be disengaged for a long time.

The first fuel feed stop condition may be identical to the second fuel feed stop condition.

The delay time may be set to not shorter than 0.1 second and not longer than 1 second.

In a case where the driver quickly performs an operation for shifting the transmission gear position, empirically, the clutch is turned to be engaged before a lapse of the delay time from a time point when the clutch starts to be disengaged. In accordance with the configuration, since the delay time is set to 0.1 second or longer, it is possible to avoid an event that the fuel feeding is resumed after the clutch is disengaged by the normal driver's shift operation. In addition, since the delay time is set to 1 second or shorter, it is possible to avoid that resuming the fuel feeding to the engine is retarded and thereby an engine stall occurs.

The delay time may be changed according to a parameter indicating a driving state of the engine.

In accordance with the configuration, the delay time is set to a value according to parameters (e.g., engine speed, throttle valve opening degree, vehicle speed, transmission gear position, air-intake pressure, engine cooling water temperature, atmospheric pressure, driving mode, etc.) indicating the driving state of the engine. Therefore, the fuel consumption efficiency is improved and the exhaust gas is reduced.

The delay time may be set to a time period after which the fuel feeding is resumed before an engine stall occurs.

In accordance with the configuration, the fuel consumption efficiency is improved and the exhaust gas is reduced while preventing the engine stall.

The fuel feed stop controller may be configured to compensate for a fuel feed amount such that the fuel feed amount in an initial state of resuming the fuel feeding is larger than a fuel feed amount in a normal state when the fuel feeding to the engine is resumed.

In accordance with the configuration, even if a part of the fuel adheres to the inner wall and is not vaporized because the fuel feed stop control continues and the fuel feeding is resumed after the inner wall is dried, the fuel adhering to the inner wall can be compensated for. As a result, the responsiveness to the driver's throttle operation is improved, and the driver can enjoy a pleasant driving feel.

The fuel feed stop controller may be configured to compensate for a fuel feed amount such that the fuel feed amount in an initial state of resuming the fuel feeding is smaller than a fuel feed amount in a normal state when the fuel feeding to the engine is resumed.

In accordance with the configuration, the engine speed is increased smoothly when the fuel feeding is resumed from the fuel feed stop state. As a result, the driver can enjoy a driving feel with shocks mitigated.

The vehicle may further comprise an engine speed detector configured to detect an engine speed. The fuel feed stop controller may be configured to, in a state where the first fuel feed stop condition is satisfied, resume fuel feeding to the engine before a lapse of the delay time when the engine speed detected by the engine speed detector is a predetermined value or lower and the clutch state detector detects that the clutch is disengaged.

In accordance with the configuration, since the fuel feeding is resumed upon the clutch being disengaged, when the engine speed is low, the engine stall is inhibited.

According to another aspect of the present invention, a fuel feed stop controller is provided for use with a vehicle including an engine coupled to a transmission via a clutch, the fuel feed stop controller being configured to stop fuel feeding to the engine when a first fuel feed stop condition is satisfied; and configured to resume the fuel feeding to the engine, when a second fuel feed stop condition continues to be satisfied and the clutch continues to be disengaged for a predetermined delay time from a time point when the first fuel feed stop condition is satisfied and disengagement of the clutch starts to be detected.

In accordance with such a configuration, when the clutch is engaged before a lapse of the delay time from a time point when the clutch starts to be disengaged in the state where the fuel feed stop condition is satisfied, the fuel feeding to the engine will not be resumed. This reduces chances for resuming the fuel feeding to the engine. As a result, fuel consumption efficiency in the vehicle is improved and the exhaust gas emitted from the vehicle is reduced. In addition, after the delay time lapses from a time point when the clutch starts to be disengaged in the state where the fuel feed stop condition is satisfied, the fuel feeding to the engine is resumed. Therefore, it is possible to inhibit an engine stall when the clutch continues to be disengaged for a long time.

The above and further objects, features and advantages of the present invention will more fully be apparent from the following detailed description of preferred embodiments with accompanying drawings.

DETAILED DESCRIPTION OF THE PREFERRED EMBODIMENTS

Hereinafter, embodiments of the present invention will be described with reference to the drawings. As used hereinafter, the direction is referenced from a driver mounting a motorcycle.

Figure 1:
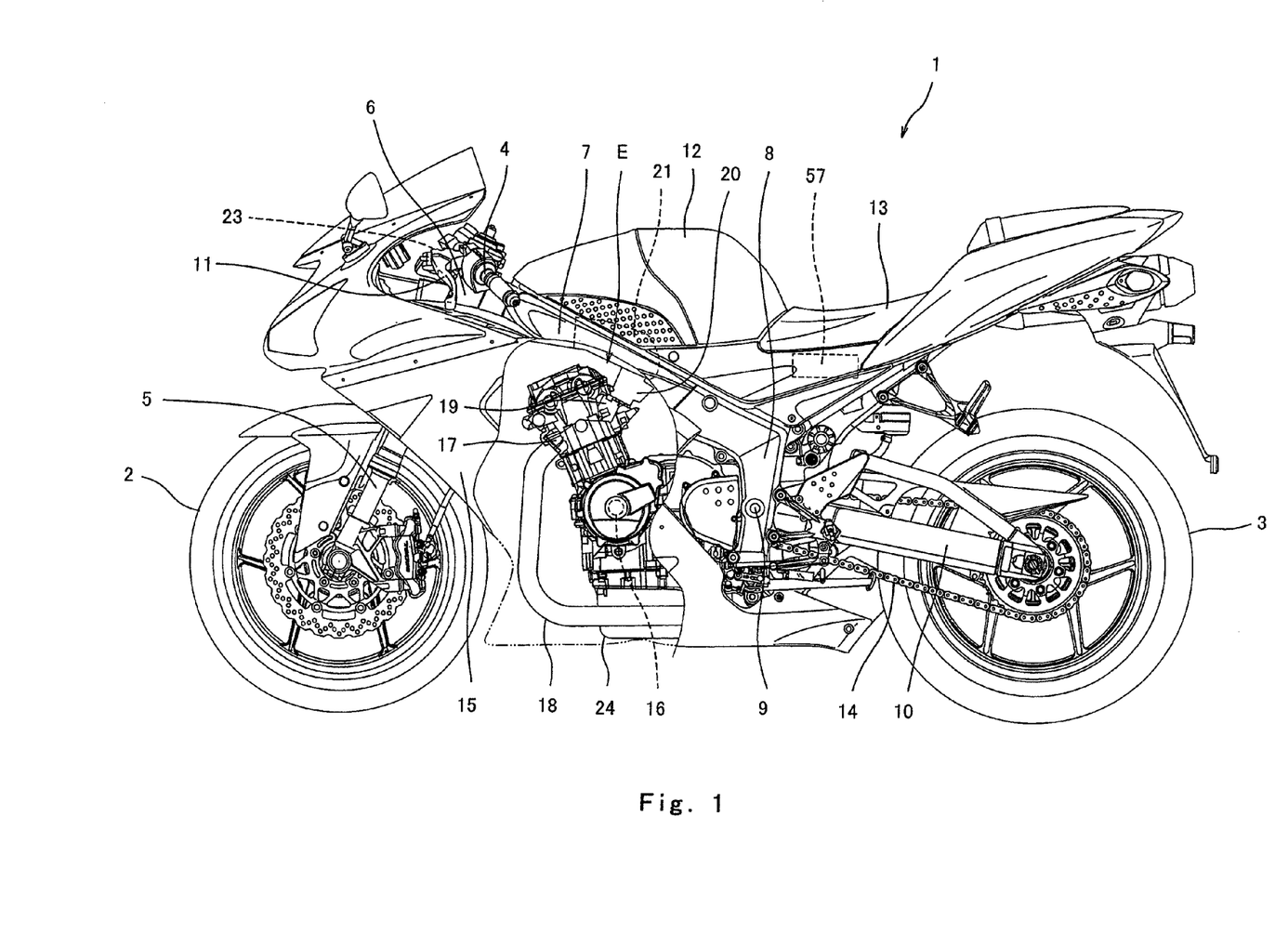
FIG. 1 is a left side view of a motorcycle according to an embodiment of the present invention.

FIG. 1 is a left side view of a motorcycle 1 according to an embodiment of the present invention. As shown in FIG. 1, the motorcycle 1 includes a front wheel 2 and a rear wheel 3. The front wheel 2 is rotatably mounted to a lower end portion of a front fork 5 extending substantially vertically. A bar-type steering handle 4 extending rightward and leftward is mounted to an upper portion of the front fork 5 via a steering shaft (not shown). The steering shaft is rotatably supported by a head pipe 6 forming a part of a frame. When the driver rotates the steering handle 4 around the steering shaft, the front wheel 2 can be turned in a desired direction.

The steering handle 4 is provided with a clutch lever 11 at a left grip portion thereof. A clutch switch 23 is attached to a base portion of the clutch lever 11. The clutch switch 23 serves as a clutch state detector for detecting whether or not the driver is gripping the clutch lever 11. A pair of right and left main frame members 7 extend rearward from the head pipe 6. A pair of pivot frame members 8 respectively extend downward from the rear portions of the main frame members 7. A swing arm 10 is pivotally mounted at a front end portion thereof to a pivot 9 provided at each of the pivot frame members 8. The rear wheel 3 is rotatably mounted to the rear end portions of the swing arms 10.

A fuel tank 12 is provided above the main frame members 7 and behind the steering handle 4. A seat 13 which is straddled by the driver is provided behind the fuel tank 12. An engine E is mounted below the main frame members 7 and a cowling 15 covers both sides of the engine E. The engine E is an inline four-cylinder four-cycle engine. A crankshaft 16 is oriented to extend along a rightward and leftward direction of the vehicle body. The driving power of the engine E is transmitted via a chain 14 to the rear wheel 3, which rotates, causing the motorcycle 1 to drive.

An exhaust pipe 18 is coupled to an exhaust port 17 of the engine E. The exhaust pipe 18 extends from a region forward of the engine E to a region behind the engine E, through a region under the engine E. A downstream end portion of the throttle device 20 in an air flow direction is coupled to an air-intake port 19 of the engine E. An air cleaner box 21 is disposed between the right and left main frame members 7 and is coupled to an upstream end portion of the throttle device 20.

Figure 2:
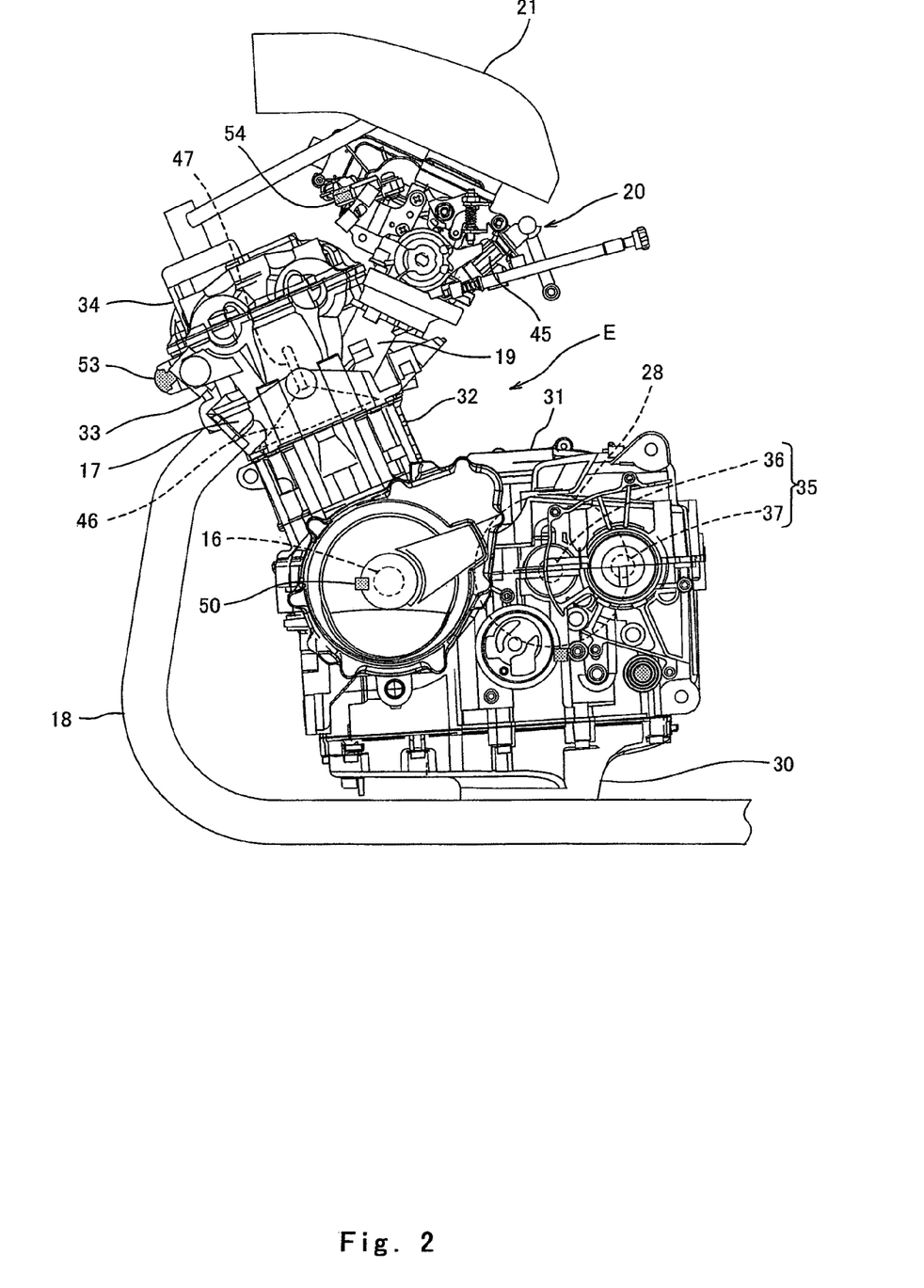
FIG. 2 is a left side view showing an engine mounted in the motorcycle of FIG. 1.

FIG. 2 is a left side view showing the engine E of the motorcycle 1 shown in FIG. 1. As shown in FIG. 2, the engine E includes as major components, an oil pan 30, a crankcase 31, a cylinder block 32, a cylinder head 33, and a cylinder head cover 34, which are arranged in this order from below. In the crankcase 31, the crankshaft 16, and a main shaft 36 and a counter shaft 37 forming a transmission 35 are accommodated. The clutch 28 is attached to one end of the main shaft 36. During an engaged state of the clutch 28, the rotational force of the crankshaft 16 is transmitted to the main shaft 36 via the clutch 28. By the driver's operation of gripping the clutch lever 11 (see FIG. 1), the clutch 28 is disengaged to disenable the driving power from the engine E to be transmitted to the rear wheel 3.

A DOHC valve system (not shown) is accommodated in the cylinder head cover 34. An exhaust port 17 is formed at a front portion of the cylinder head 33 and an intake port 19 is formed at a rear portion thereof. The throttle device 20 is coupled to the intake port 19.

Figure 3:
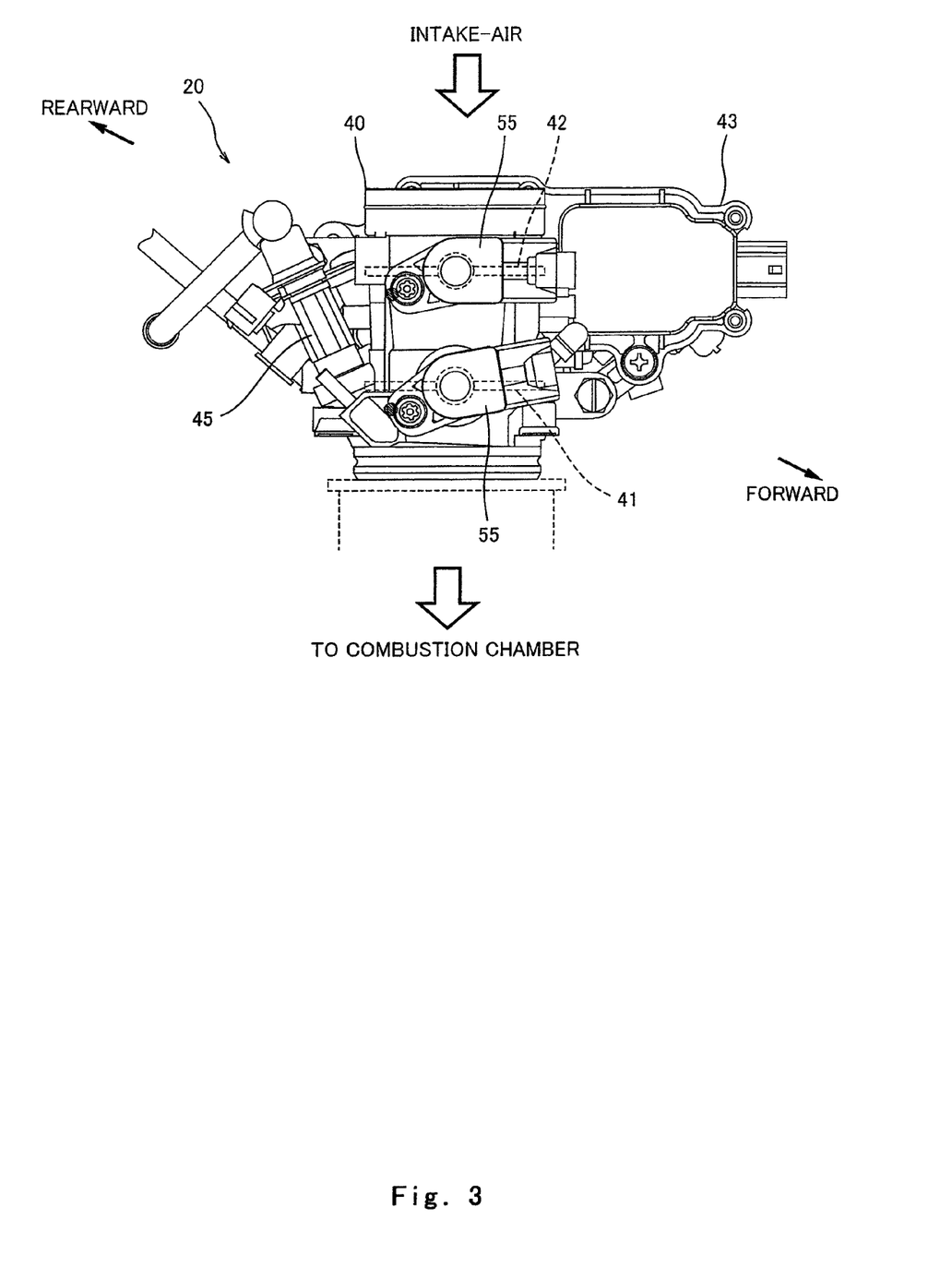
FIG. 3 is a right side view of a throttle device in the engine of FIG. 2.

FIG. 3 is a right side view of the throttle device 20 in the engine E of FIG. 2. As shown in FIG. 3, the throttle body 20 includes a body 40 having four air-intake passages respectively corresponding to the cylinders of the engine E. In each air-intake passage of the body 40, a main throttle valve 41 and a sub-throttle valve 42 are arranged such that the main throttle valve 41 is located downstream of the sub-throttle valve 42 in an air flow direction. The main throttle valve 41 is coupled to a throttle grip (not shown) provided at a right grip of the steering handle 4 (see FIG. 1) via a cable. The main throttle valve 41 is rotated according to the driver's operation for rotating the throttle grip, opening and closing the air-intake passage. A motor 43 is coupled to the rotational shaft of the sub-throttle valve 42 via a transmission gear. The sub-throttle valve 42 is rotated in accordance with a command from an ECU (electronic control unit) 57 disposed below the seat 13 as shown in FIG. 1, opening and closing the air-intake passage.

As shown in FIGS. 2 and 3, the throttle device 20 includes a fuel injector 45 at a rear portion of the body 40. The fuel injector 45 is provided for each air-intake passage. The fuel injector 45 is fed with a fuel from the fuel tank 12 (see FIG. 1) disposed thereabove and injects a mist to an inside of the air-intake passage, in accordance with a command from the ECU 57 (see FIG. 1). The injected fuel mist is mixed with the intake-air, and the resulting air-fuel mixture is suctioned into a combustion chamber 46 (see FIG. 2) defined by the cylinder block 32 and the cylinder head 33. An igniter 47 is attached at the upper portion of the combustion chamber 46. The igniter 47 ignites the air-fuel mixture suctioned into the combustion chamber 46 in accordance with a command from the ECU 57 (see FIG. 1) to combust the air-fuel mixture.

As shown in FIG. 2, the engine E is provided with an engine speed sensor 50. The engine speed sensor 50 is an engine speed detector configured to detect a rotational angle of the crankshaft 16 so as to detect an engine speed. As shown in FIG. 3, the throttle device 20 is provided with a throttle valve opening degree sensor 55 (see FIG. 3) configured to detect an opening degree of the main throttle valve 41 and an opening degree of the sub-throttle valve 42.

Figure 4:
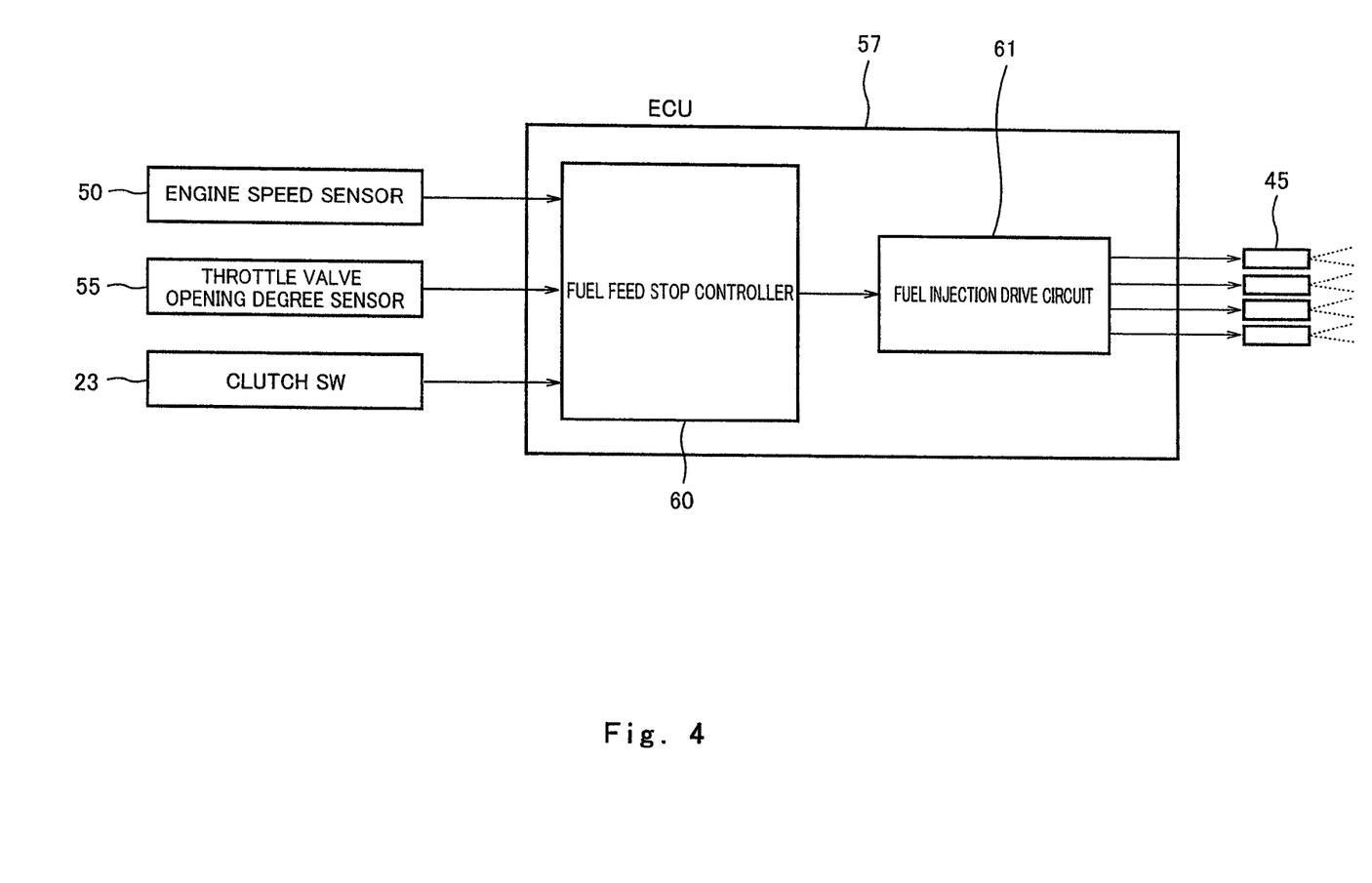
FIG. 4 is a block diagram showing a configuration of an ECU and the like in the motorcycle of FIG. 1.

FIG. 4 is a block diagram showing a configuration of the ECU 57 and the like in the motorcycle 1 of FIG. 1. Turning to FIG. 4, the engine speed sensor 50, the throttle valve opening degree sensor 55 and clutch switch 23 are communicatively coupled to the ECU 57 which is a fuel feed stop controller. The ECU 57 is configured to control stopping and resuming of the fuel feeding to the intake-air supplied to the engine E based on the signals received from the sensors 50 and 55 and the clutch switch 23. To be specific, the ECU 57 includes a fuel injection drive circuit 61 configured to drive the fuel injector 45 provided for each cylinder and a fuel feed stop control unit 60 configured to output to the fuel injection drive circuit 61 a control signal relating to stop or resuming the fuel feeding.

Figure 5:
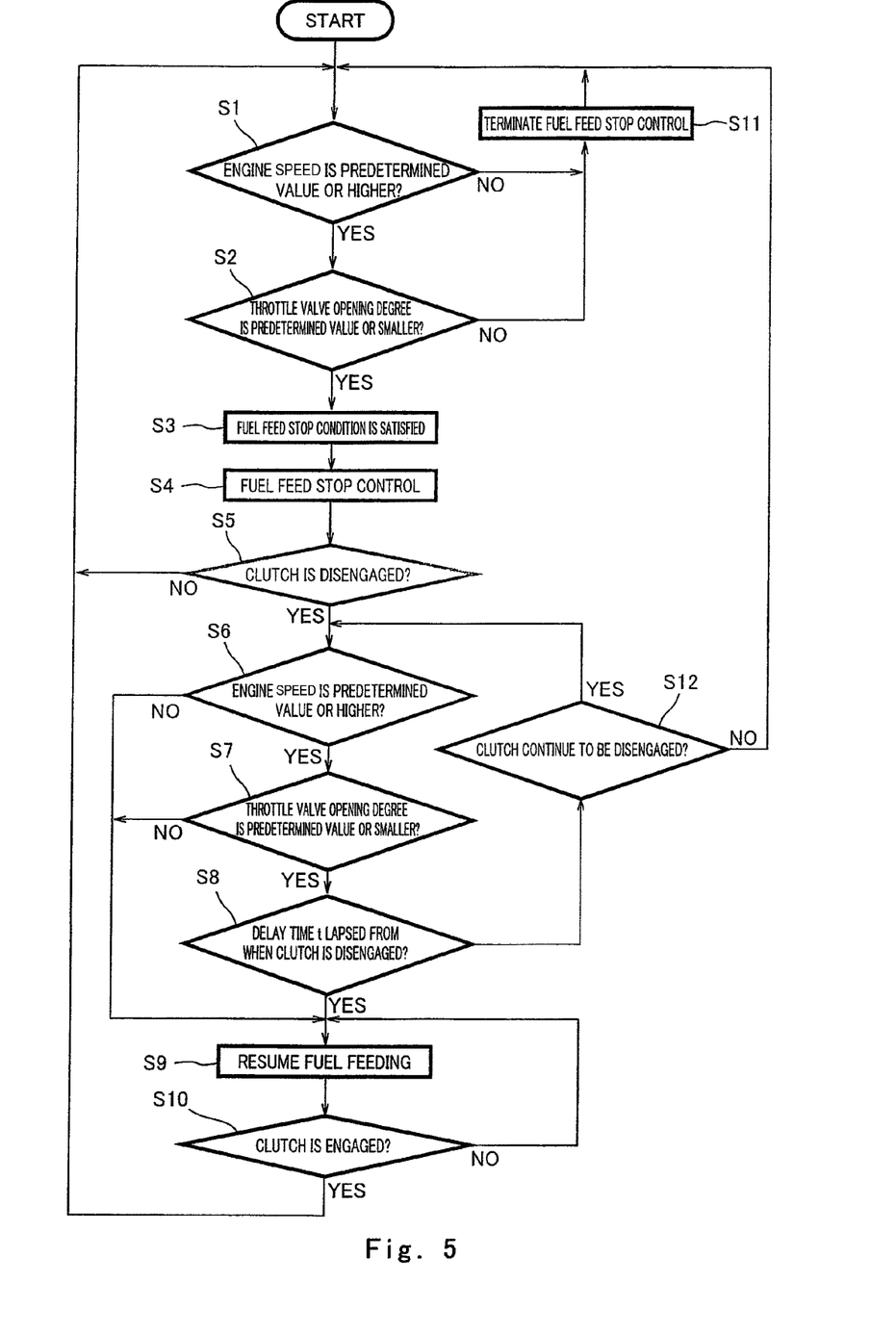
FIG. 5 is a flowchart showing a control process performed by the ECU of FIG. 4.

FIG. 5 is a flowchart showing a control process performed by the ECU 57 of FIG. 4. Hereinafter, the fuel feed stop control during a deceleration state of the engine E will be described with reference to FIGS. 4 and 5. Initially, the fuel feed stop control unit 60 of the ECU 57 determines whether or not a driving state of the engine E satisfies a predetermined fuel feed stop condition. To be specific, the fuel feed stop control unit 60 determines whether or not the engine speed detected by the engine speed sensor 50 is a predetermined value (e.g., 2000 to 2500 rpm) or higher (step S1). If it is determined as YES in step S1, the fuel feed stop control unit 60 determines whether or not the throttle valve opening degree detected by the throttle valve opening degree sensor 55 is a predetermined value (e.g., 5 to 10 degrees) or smaller (step S2). If it is determined as YES in step S2, the fuel feed stop control unit 60 determines that the fuel feed stop condition is satisfied (step S3). If it is determined as NO in step 51 or step S2, the fuel feed stop control is terminated (step S11) and the process returns to step S1.

If it is determined that the fuel feed stop condition is satisfied in step S3, the fuel feed stop control is initiated (step S4). In the fuel feed stop control, the fuel feeding from the fuel injector 45 to the intake-air is forcibly stopped. Thus, wasteful fuel consumption during the deceleration state is reduced, improving fuel consumption efficiency and reducing an exhaust gas.

In the fuel feed stop control, if the clutch 28 is disengaged, an engine stall is likely to occur. Therefore, it is necessary to suitably resume the fuel feeding. To this end, it is determined whether or not the clutch switch 23 detects that the driver is gripping the clutch lever 11, i.e., the clutch 28 is disengaged (step S5). If it is determined as NO in step S5, the process returns to step S1 to continue the fuel feed stop control. On the other hand, if it is determined as YES in step S5, it is determined whether or not the engine speed detected by the engine speed sensor 50 is a predetermined value (e.g., 2000 to 2500 rpm) or higher (step S6). The predetermined value in step S6 may be equal to or different from the predetermined value in step S1.

If it is determined as NO in step S6, the engine speed is low and the engine stall is likely to occur by disengaging the clutch 28. Therefore, the fuel feeding is resumed promptly (step S9). On the other hand, if it is determined as YES in step S6, it is determined whether or not the throttle valve opening degree detected by the throttle valve opening degree sensor 55 is a predetermined value (e.g., 5 to 10 degrees) or smaller (step S7). The predetermined value in step S7 may be equal to or different from the predetermined value in step S2. If it is determined as NO in step S7, it may be presumed that the driver has an intention to accelerate the motorcycle 1 or increase the engine speed, and therefore the fuel feeding is resumed promptly (step S9).

On the other hand, if it is determined as YES in step S7, i.e., the fuel feed stop condition continues to be satisfied, it is determined whether or not a predetermined delay time t (e.g., 0.1 second≤t≤1 second) has lapsed from the time point when the clutch switch 23 starts to detect that the clutch 28 is disengaged (step S8). The delay time t is set to a value according to parameters (e.g., engine speed, throttle valve opening degree, vehicle speed, transmission gear position, air-intake pressure, engine cooling water temperature, atmospheric pressure, etc.) indicating the driving state of the engine E.

If it is determined as NO in step S8, it is determined whether or not the clutch switch 23 still continues to detect that the driver is gripping the clutch lever 11 (step S12). If it is determined as NO in step S12, it is determined that the clutch 28 is engaged and the engine stall will not occur, and therefore the process returns to step S1 to continue the fuel feed stop control. That is, if the disengagement time of the clutch 28 is shorter than the delay time t, the fuel feeding is not resumed.

If it is determined as YES in step S12, the process returns to step S6. If it is determined as YES in step S8, the predetermined delay time t lapses from a time point when the clutch 28 starts to be disengaged and the engine stall is likely to occur. Therefore, the fuel feeding to the engine E is resumed (step S9). That is, if the disengagement time of the clutch 28 is equal to or longer than the delay time t, the fuel feeding to the engine E is resumed to inhibit the engine stall. Then, it is determined whether or not the clutch switch 23 detects that the driver has released the clutch lever 11, i.e., the clutch 28 is engaged (step S10). If it is determined as NO in step S10, the process returns to step S9 to maintain the state where the fuel is fed to the engine E. On the other hand, if it is determined as YES in step S10, the process returns to step S1 to return to the fuel feed stop control.

Figure 6:
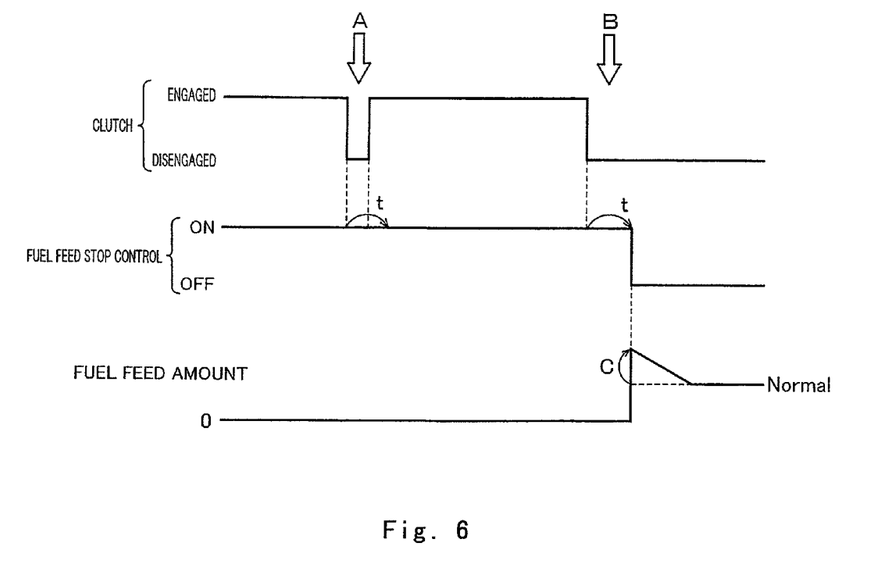
FIG. 6 is a timing chart showing a control process performed by the ECU when a fuel feed stop condition is satisfied.

FIG. 6 is a timing chart showing a control process performed by the ECU 57 when the fuel feed stop condition is satisfied. In FIG. 6, a horizontal axis indicates time. As shown in FIG. 6, if the clutch 28 is disengaged for a short time because of, for example, the downshifting in the deceleration state at a time point A, when the fuel feed stop condition (the engine speed is the predetermined value or higher and the throttle valve opening degree is the predetermined value or smaller) is satisfied during a deceleration state, the clutch 28 is returned to an engaged state before a lapse of the delay time t, and therefore the fuel feed stop control is continued. On the other hand, if the clutch 28 continues to be disengaged for a time longer than the delay time t at time point B, for example, the fuel feeding is resumed after a lapse of the delay time t from start of the disengagement of the clutch 28.

Figure 7:
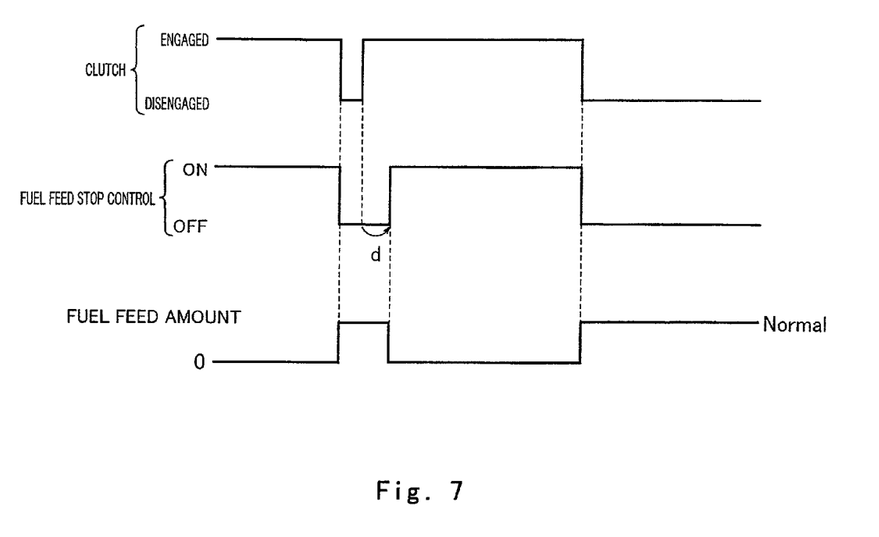
FIG. 7 is a timing chart corresponding to FIG. 6 according to a comparative example.

On the other hand, in a comparative example of FIG. 7, the fuel feeding is resumed promptly when the clutch 28 is disengaged in the state where the fuel feed stop control is executed. After that, if the clutch 28 is engaged, the control process returns to the fuel feed stop control after a lapse of a predetermined time d to inhibit chattering. Thus, in the comparative example, the fuel feeding is resumed more frequently than in the above-described embodiment in the state where the fuel feed stop condition is satisfied. As can be understood from comparison between FIG. 6 and FIG. 7, in accordance with this embodiment, the chances for resuming the fuel feeding (OFF of the fuel feed stop control) during a deceleration in the state where the fuel feed stop condition is satisfied are reduced, improving fuel consumption efficiency and reducing an exhaust gas.

If the fuel feed stop control is continued, the inner walls of the air-intake port 19 and the air-intake passage of the throttle device 20 in the engine E are dried. Therefore, a part of the fuel injected when the fuel feeding is resumed adheres to the inner walls and is not vaporized. To compensate for the fuel adhering to the inner walls, the fuel is injected with an amount obtained by adding a compensation amount C to a normal fuel feed amount, and the compensation amount C is gradually reduced to zero with a lapse of time, in an initial state of resuming the fuel feeding. That is, in the initial state of resuming the fuel feeding, the fuel feed amount is compensated for by being larger than normal. This improves responsiveness to the driver's throttle operation and therefore improves driving feeling. As used herein, the term "normal fuel feed amount" means a reference fuel feed amount which is predetermined according to the engine speed, the throttle valve opening degree, the air-intake pressure, etc. To be specific, in a normal state, the ECU 57 is configured to determine the fuel feed amount with reference to a map containing a fuel feed amount predetermined according to the driving state of the motorcycle 1. Therefore, the fuel feed amount in the initial stage of resuming the fuel feeding is compensated for by being larger than the fuel feed amount determined based on the map.

Figure 8:
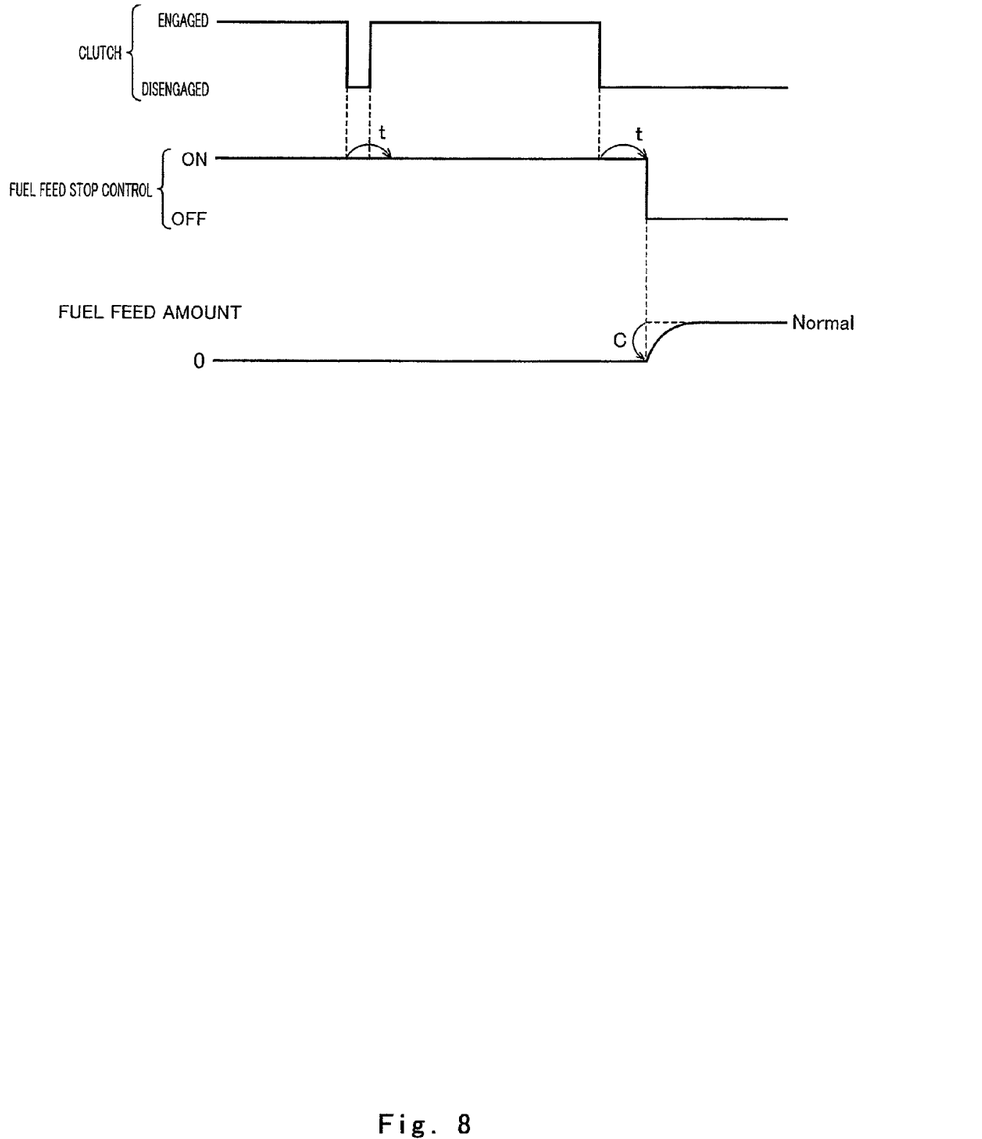
FIG. 8 is a timing chart showing a control process performed by the ECU when a fuel feed stop condition is satisfied, according to an alternative example of the present invention.

In an alternative example, the fuel feed amount in the initial state of resuming the fuel feeding may be set smaller than normal. FIG. 8 is a timing chart showing a control process performed by the ECU 57 when the fuel feed stop condition is satisfied, according to an alternative example of the present invention. As shown in FIG. 8, when the fuel feeding is resumed in the state of the fuel feed stop state, the fuel is injected with an amount obtained by subtracting a compensation amount C from the normal fuel feed amount, and the compensation amount C is gradually reduced to zero with a lapse of time, in an initial state of resuming of the fuel feeding. That is, in the initial state of resuming the fuel feeding, the fuel feed amount is compensated for by being smaller than normal so that the fuel feed amount is gradually increased up to the normal fuel feed amount. This makes it possible to increase the engine speed smoothly when the fuel feeding is resumed in the fuel feed stop control state. As a result, the driver can enjoy a driving feel with shocks mitigated.

Whereas the motorcycle 1 has been described in this embodiment, the present invention is applicable to other vehicles, for example, an all terrain vehicle (ATV). Whereas the clutch switch 23 is used as the clutch state detector in this embodiment, various sensors may be used so long as they are capable of detecting the state of the clutch 28 (engaged or disengaged). Although the fuel feed stop condition is determined based on the engine speed and the throttle valve opening degree in this embodiment, it may be determined based on the air-intake pressure of the engine or engine cooling water temperature, etc.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A vehicle including a clutch provided at a driving power transmission path from an engine to a drive wheel, comprising:
    a fuel feed stop controller configured to perform fuel feed stop control for stopping fuel feeding to the engine when a first fuel feed stop condition is satisfied; and
    a clutch state detector configured to detect whether the clutch is engaged or disengaged;
    wherein the fuel feed stop controller is configured to resume the fuel feeding to the engine when the clutch continues to be disengaged for a predetermined time after a time point when the clutch is disengaged under the condition that the fuel feed stop control is performed; and
    wherein the fuel feed stop controller is configured to continue the fuel feed stop control if the clutch returns to an engaged state before a lapse of the predetermined time after a time point when the clutch is disengaged under the condition that the fuel stop control is performed, and for so long as the first fuel stop condition is satisfied.

2. The vehicle according to claim 1, wherein the predetermined time is set to not shorter than 0.1 second and not longer than 1 second.

3. The vehicle according to claim 1, wherein the predetermined time is changed according to a parameter indicating a driving state of the engine.

4. The vehicle according to claim 1, wherein the predetermined time is set to a time period after which the fuel feeding is resumed before an engine stall occurs.

5. The vehicle according to claim 1, wherein the fuel feed stop controller is configured to compensate for fuel feed amount such that the fuel feed amount in an initial state of resuming the fuel feeding is larger than a fuel feed amount in a normal state when the fuel feeding to the engine is resumed.

6. The vehicle according to claim 1, wherein the fuel feed stop controller is configured to compensate for fuel feed amount such that the fuel feed amount in an initial state of resuming the fuel feeding is smaller than a fuel feed amount in a normal state when the fuel feeding to the engine is resumed.

7. The vehicle according to claim 1, further comprising:
an engine speed detector configured to detect an engine speed;
wherein the fuel feed stop controller is configured to, in a state where the first fuel feed stop condition is satisfied, resume fuel feeding to the engine before a lapse of the predetermined time when the engine speed detected by the engine speed detector is a predetermined value or lower and the clutch state detector detects that the clutch is disengaged.

8. The vehicle according to claim 1,
wherein when the first fuel feed stop condition is satisfied, a clutch state detector detects that the clutch is disengaged, a second fuel feel stop condition continues to be satisfied for the predetermined time after a time point when the clutch state detector detects that the clutch is disengaged, fuel feeding to the engine is resumed.

9. The vehicle according to claim 1, wherein when it is determined that a throttle valve opening degree has exceeded a predetermined value, the fuel feed stop controller resumes fuel feeding to the engine even if the clutch does not continue to be disengaged for the predetermined time after a time point when it is determined that the throttle valve opening degree exceeded the predetermined value.

10. The vehicle according to claim 1, wherein the predetermined time is set to a value corresponding to a vehicle speed or a transmission gear position.

11. The vehicle according to claim 1, wherein the predetermined time is set to a value corresponding to a throttle valve opening degree or an air-intake pressure.

12. A fuel feed stop control method for use with a vehicle including a clutch provided at a driving power transmission path from an engine to a drive wheel, the method comprising:
a first step of determining whether or not a first fuel feed stop condition is satisfied;
a second step of stopping fuel feeding to the engine when it is determined that the first fuel feed stop condition is satisfied in the first step;
a third step of resuming the fuel feeding to the engine when the first fuel feed stop condition is not satisfied in the second step;
a fourth step of resuming the fuel feeding to the engine when the clutch continues to be disengaged for a predetermined time after a time point when the clutch is disengaged under the condition of stopping the fuel feeding to the engine in the second step; and
a fifth step of returning to the first step when it is detected that the clutch is disengaged and the clutch is returned to an engaged state before a lapse of the predetermined time after the time point when the clutch is disengaged under the condition of stopping the fuel feeding to the engine in the second step.

13. The method according to claim 12,
wherein in the fourth step, when it is detected that the clutch is disengaged in the second step, and a second fuel feed stop condition continues to be satisfied and the clutch continues to be disengaged for the predetermined time after a time point when it is detected that the clutch is disengaged, the fuel feeding to the engine is resumed.

14. The method according to claim 13, wherein the first fuel feed stop condition is the same as the second fuel feed stop condition.

15. The method according to claim 13, wherein the first fuel feed stop condition and the second fuel feed stop condition are different from each other.

16. A vehicle including a clutch provided at a driving power transmission path from an engine to a drive wheel, comprising:
a fuel feed stop controller configured to perform fuel feed stop control for stopping fuel feeding to the engine when a first fuel feed stop condition is satisfied; and
a clutch state detector configured to detect whether the clutch is engaged or disengaged;
wherein the fuel feed stop controller is configured to resume the fuel feeding to the engine when the clutch continues to be disengaged for a predetermined time after a time point when the clutch is disengaged under the condition that the fuel stop control is performed; and
the fuel feed stop controller is configured to continue the fuel feed stop control when the clutch returns to an engaged state before a lapse of the predetermined time after a time point when the clutch is disengaged under the condition that the fuel stop control is performed.

* * * * *